Nov. 1, 1927.
A. MOORHOUSE
MOTOR VEHICLE
Filed June 16, 1923  2 Sheets-Sheet 2
1,647,839
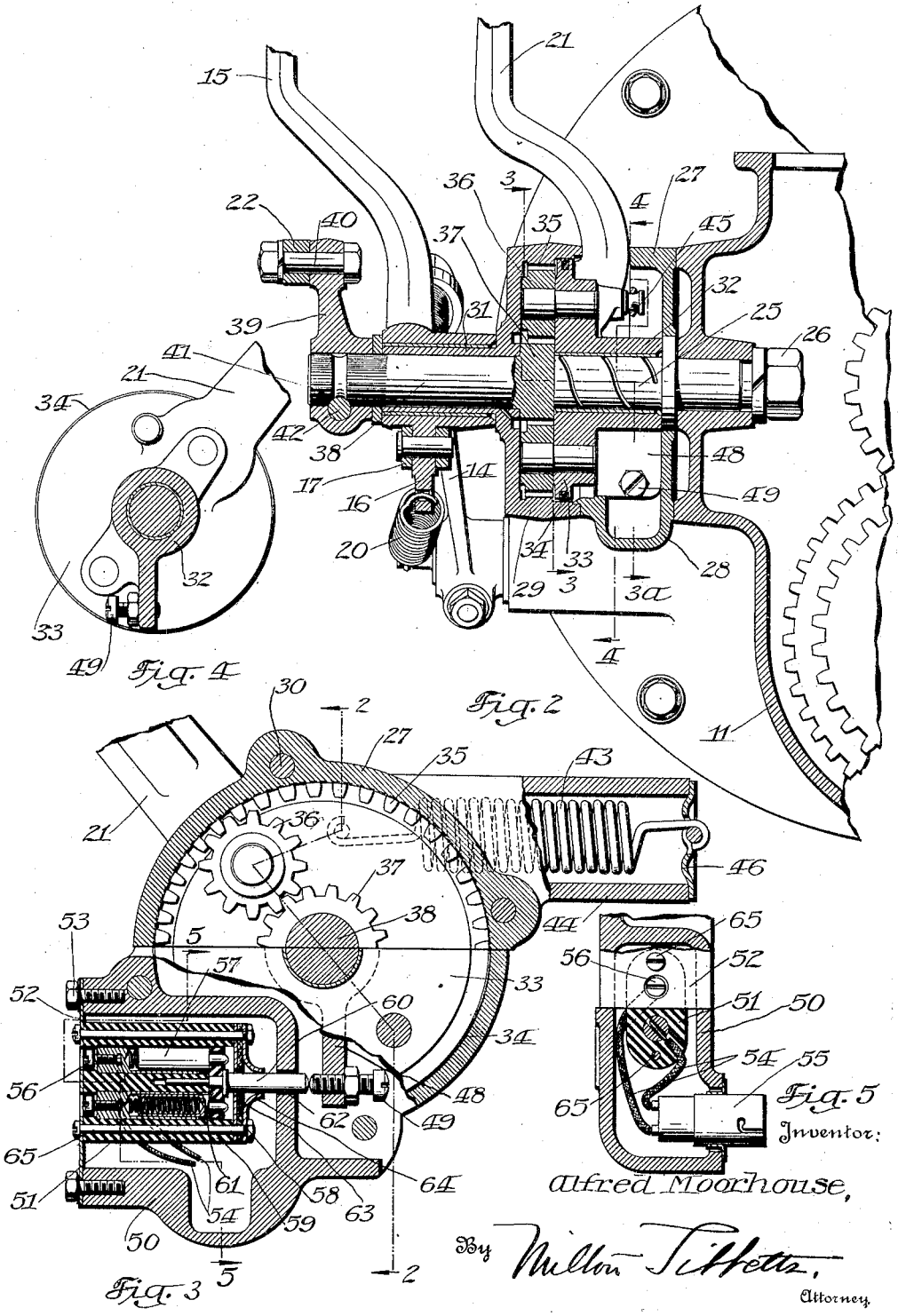
Inventor:
Alfred Moorhouse,
By Milton Tibbetts,
Attorney Patented Nov. 1, 1927.

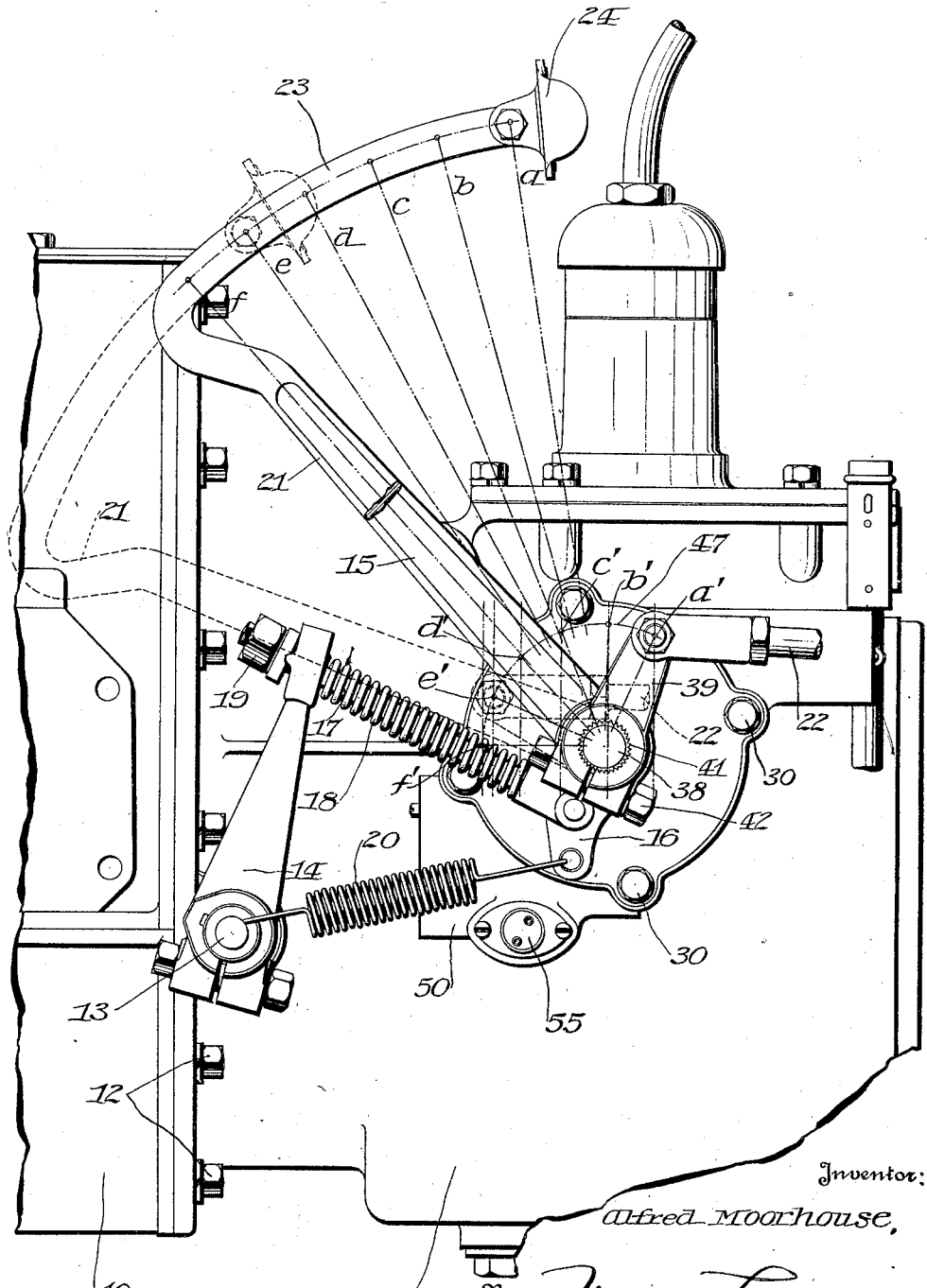

1,647,839

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed June 16, 1923. Serial No. 645,781.

This invention relates to motor vehicles and particularly to the mechanism for controlling the vehicle.

One of the objects of the invention is to provide a novel form of movement multiplying means between the brake lever and the brake devices.

Another object is to provide a brake operating mechanism that will have a multiplying effect during its initial movement and the effect of increased leverage at its final movement.

Another object is to provide a novel mounting for the brake and clutch levers of a motor vehicle.

Another object is to provide a novel form of planetary gearing between the brake lever and the brake operating devices.

Another object is to provide suitable housing and supporting means for the brake operating mechanism and the clutch lever of a motor vehicle.

Another object of the invention is to provide an indicating switch for the brake mechanism, together with suitable housing and supports for the switch and mechanism.

Other objects of the invention will appear from the following description taken in connection with the drawings, which form a part of this specification, and in which:

Fig. 1 is a side elevation of a motor vehicle clutch and gear housing with a mechanism illustrating one form of my invention mounted thereon;

Fig. 2 is substantially a vertical section through the shafts of the brake and clutch levers of Fig. 1, and the section is approximately indicated at 2—2 on Fig. 3;

Fig. 3 is a somewhat enlarged view mostly on the line 3—3 of Fig. 2, the lower left-hand part of Fig. 3 being a section on the line 3ᵃ of Fig. 2;

Fig. 4 is a section substantially on the line 4—4 of Fig. 2, the housing, however, being omitted; and Fig. 5 is a vertical section through the switch housing, substantially on the line 5—5 of Fig. 3.

Referring to the drawings, 10 represents the clutch housing part of a motor vehicle engine crankcase and 11 is the transmission case or gear housing which is preferably secured to the clutch housing as by the bolts 12. These parts form the support for the brake and clutch operating mechanism of this invention.

A clutch operating shaft 13 extends through the side of one of the housings and an arm 14 is provided on the projecting end of said shaft for throwing the clutch out. The clutch is thrown into engagement by a suitable spring which usually forms a part of the clutch itself. A lever 15 is mounted as will hereinafter appear in detail and it is provided with a short arm 16 which connects by a rod 17 and spring 18 with the end of the arm 14. An adjusting nut 19 on the threaded end of the rod 17 is provided for shortening the rod against the action of the spring 18.

From the above it will be seen that the clutch may be released or thrown out by moving the clutch lever 15, the upper end of which has been broken away, which movement will turn the arm 16 and through it and the rod 17 the arm 14 will rock the shaft 13. The spring on the inside of the clutch will keep the arm 14 in contact with the nut 19 so that the rod 17 is under tension only. When the lever 15 is released by the operator the clutch spring will retract the arm 14 and consequently the lever 15 until the clutch is fully engaged. A spring 20 which is connected to the arm 16, will then retract the lever 15 and the arm 14 a short distance farther so that the clutch shifter inside of the casing will be entirely out of contact with the rotating part of the clutch.

There is also suitably mounted upon the support a brake lever 21 and a brake operating device in the form of a rod 22, which rod is adapted to be connected to the brakes of the vehicle so that when the rod is moved to the left, as shown in Fig. 1, the brakes will be applied. In said Fig. 1 the rod is shown in full lines with the brakes in "off" or inoperative position, and in dotted lines the rod 22 is shown in the "on" position of the brakes.

Means are provided between the brake lever 21 and the brake operating device 22 for so multiplying the movement from one to the other during the initial movement of the brake lever that the slack in the connections may be easily and quickly taken up. In the further movement of the brake lever the connecting means is such that the movement is not so much multiplied or in fact the leverage may actually be increased, so that the brakes may be more easily applied with force after the slack has been taken up.

The clutch lever 15 and the brake lever 21 are substantially the same shape and are mounted on the same axis, so that the clutch lever is superimposed upon the brake lever in Fig. 1. It is broken away, however, so that the brake lever 21 may be seen in that figure. This brake lever has an arc shaped portion 23 which is arranged to extend through the floor board of a motor vehicle, and a pedal pad 24 is arranged on the end of the part 23 so that it may be engaged by the foot of the operator in the usual way. The brake lever is shown in full lines in Fig. 1 in its released or "off" position and in dotted lines it is substantially in full applied or "on" position.

The brake lever 21 is mounted on a stud or spigot bearing 25 which extends through the side wall of the gear housing 11, as shown particularly in Fig. 2, being secured to the housing or support as by a nut 26. Also secured to the support or housing 11 is a two-part casing or housing 27, the parts 28 and 29 of which are secured to the support and to each other by several bolts indicated at 30.

The part 29 of this housing 27 is formed with a spigot bearing or projecting part 31 upon the outer surface of which the clutch lever 15 is mounted, as shown particularly in Fig. 2. This bearing is preferably axially in line with the spigot bearing 25 upon which the brake lever 21 is mounted and both of these levers, therefore, are supported directly upon the support or housing 11, and yet each of them is mounted on a bearing independent of the other.

The brake lever 21 is formed with a hub 32 which surrounds the spigot bearing 25 and is also formed with a disk shaped part 33 the periphery of which is provided with a packing ring 34 fitting the inner wall of the casing 27 and thereby dividing the casing into two compartments, one on either side of the disk 33.

The part 29 of the casing 27 is formed interiorly with gear teeth 35 and mounted upon the brake lever 21 within the housing is a planet gear 36 meshing with the internal gear 35. In the form shown there are two of these gears 36.

Meshing with the planet gears 36 is a pinion 37 which is mounted on a shaft 38 coaxially with the spigot bearing 25 and extending through and having a bearing in the spigot bearing 31. Upon the projecting end of this rock shaft 38 is keyed an arm 39 to which is pivotally connected the device or rod 22, as by a pin 40. The end of the shaft 38 is preferably serrated as shown at 41 and the hub of the arm 39 is similarly formed so that it may be set on the shaft in any one of several positions. A tightening bolt 42 secures the arm 39 in adjusted position on the shaft.

By this connection of the rod 22 to the end of the arm 39 the arm 39 may be rocked through an arc of 90 degrees or more from substantially vertical position to substantially horizontal position, and the rod 22 will pass by the end of the shaft 38 without interference.

Means are provided for yieldingly retracting the brake lever 21. This is shown in the form of a spring 43 supported in a tubular extension 44 of the housing part 28, one end of the spring being connected to a pin 45 on the brake lever and the other being connected to a cap 46 closing the outer end of the extension.

From the above it will be seen that the hub part of the brake lever forms a spider for a planetary gearing connecting means between the brake lever and the rock shaft 38 and the gearing is so proportioned as to give substantially a three and one-half or four to one increase of angular movement. Thus a 25 degree angular movement of the brake lever will produce about 90 or 100 degrees of angular movement of the shaft 38 or arm 39. And it will be observed that since the arm 39 starts in substantially a vertical position and ends in a nearly horizontal position, it acts somewhat as a toggle in connection with the rod 22, and thereby increases its leverage as it approaches the horizontal position.

Referring to Fig. 1, it will be seen that several points in the movement of the brake lever 21 have been indicated by dot-and-dash lines $a$, $b$, $c$, $d$, $e$, and $f$. Similar points of corresponding movement of the arm 39 are laid off in an arc indicated at 47, these corresponding points being marked $a'$, $b'$, $c'$, $d'$, $e'$ and $f'$, respectively. This clearly indicates the gearing up of the shaft 38 relative to the oscillation or angular movement of the brake lever 21. It also indicates that, by reason of the horizontal travel of the rod or brake applying device 22, the leverage gradually changes from the point $a'$ to the point $f'$ and there is a place somewhere between those two points where the actual leverage between the brake lever and the device 22 changes over from a decreased leverage to an increased leverage. That place is near $e'$, which is substantially the maximum brake applying position, though it may go over nearer to dead center in some instances, but it is not desirable that the rod 22 should go over dead center as it would after passing the point f'. In dotted lines in Fig. 1 the brake lever 21 is shown in position e, which corresponds to the position e' of the lever 39.

By reason of the division of the housing 27 into two compartments, that compartment in which the gears are located may be filled with grease which will also take care of the spigot bearing 25 and the bearing of the shaft 38 in the extension 31, and the other compartment may be kept fairly clear of grease or oil. Into this latter compartment extends the spring 43 and it is necessarily open at its upper part where the brake lever 21 extends through the wall of the housing. Also mounted in this latter compartment, that is, the right-hand compartment in Fig. 2, is a switch controlling arm 48, which may be formed integral with the brake lever 21. An adjustable bolt 49 is provided on the end of this arm.

The housing part 28 is formed with a separate housing or compartment 50 in which is located a switch unit 51 mounted upon a plate 52 which is secured as by bolts 53 to the face of the housing. This switch unit is adapted to connect with an indicating device such as a stop signal at the rear of the vehicle, to indicate the position of the brake mechanism and thereby show to the driver of a following vehicle whether this vehicle is slowing down or not.

This switch is arranged to be operated by that part of the brake mechanism which has the shortest travel, which in the present instance is the brake lever 21. The switch has a pair of wires 54 which are adapted to be connected to the wiring on the vehicle through a suitable plug such as that shown at 55 in Fig. 1. The ends of the wires are secured by screws 56 to two-part spring plungers 57, the ends of which are adapted to be pressed against a brass plate 58 mounted at the end of a fibre casing within which the plungers are mounted. A push bar 60 has a plate 61 secured to it for pushing the plungers out of contact with the brass plate 58 and this push bar 60 extends through an opening 62 in the wall of the housing in a position to be moved by the bolt 49 of the arm 48.

The brass plate 58 is secured in place by a fibre plate 63 which in turn is held by another plate 64 and bolts 65 which extend through the fibre casing 59.

It will be seen that when the plungers 57 make contact with the brass plate 58 the circuit will be closed and the stop signal will be shown at the rear of the vehicle. But the plungers are kept out of contact with the brass plate as long as the brake lever 21 is in its normal or "off" position, it being shown in this position in Fig. 3. As soon as the brake lever is moved slightly towards its brake applying position the arm 48 will be moved towards the right, in Fig. 3, and the spring plungers will then be pressed against the brass plate 58 and the circuit will be closed. When the brake is retracted the contact will be broken again.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with a support, of a brake lever pivotally mounted thereon, an internal gear secured to said support, a planetary gear pivoted on said brake lever and in mesh with said internal gear, a brake operating lever mounted on said support coaxial with the pivot of said brake lever, and a pinion on said brake operating lever in mesh with said planetary gear.

2. In a motor vehicle, the combination with a support and a bearing pin thereon, of a brake lever mounted on said pin, a brake operating rock shaft, and planetary gearing between said brake lever and said shaft.

3. In a motor vehicle, the combination with a support and a bearing pin thereon, of a brake lever mounted on said pin, a second bearing part mounted on said support, a second lever mounted on said second bearing part, and a rock shaft mounted in said second bearing part and connected to be operated by said brake lever.

4. In a motor vehicle, the combination with a support and a bearing pin thereon, of a brake lever mounted on said pin, a second bearing part mounted on said support, a second lever mounted on said second bearing part, a rock shaft mounted in said second bearing part, and planetary gearing connecting said brake lever and said rock shaft.

5. In a motor vehicle, the combination with a support, of a brake lever pivotally supported thereon, a rock shaft having an operating arm, a brake applying connection on said arm mounted to produce the greatest brake applying travel when the arm is nearest its "off" position and the least brake applying travel when the arm is nearest its "on" position, and planetary gearing connecting said brake lever and said rock shaft.

6. In a motor vehicle, the combination with a support, of a housing secured to said support, a brake lever mounted in said housing and projecting therefrom, said brake lever having a part dividing said housing into two compartments, a rock shaft, gearing in one of said compartments between said brake lever and said rock shaft, and lever retracting means in the other said compartments.

7. In a motor vehicle, the combination with a support, of a housing secured to said support, a brake lever mounted in said housing and projecting therefrom, said brake lever having a part dividing said housing into two compartments, a rock shaft, gearing in one of said compartments between said brake lever and said rock shaft, and switch operating means in the other of said compartments.

8. In a motor vehicle, the combination with a support, of a housing mounted thereon and having two compartments, a brake lever mounted in one of said compartments and projecting therefrom, and gearing mounted in the other said compartment and connected to operate the brakes of the vehicle.

9. In a motor vehicle, the combination with a support, of a housing mounted thereon, a spigot bearing on said support projecting into said housing, a brake lever mounted on said bearing and extending through the wall of said housing, a rock shaft supported by said housing and gearing in the housing connecting said brake lever and said rock shaft.

10. In a motor vehicle, the combination of a support, a two-part housing removably connected to said support, a bearing within the housing, a brake lever supported on said bearing, a bearing on the outside of one of the parts of said housing, a second lever supported on said outside bearing, a rock shaft extending through the housing, and means connecting said brake lever and said rock shaft.

11. In a motor vehicle, the combination with a support, of a housing detachably secured thereto, a brake lever extending through the wall of the housing and pivotally mounted therein, a second lever mounted on the outside of said housing, a rock shaft, and means connecting said brake lever and said rock shaft.

12. In a motor vehicle, the combination with a support, of a housing detachably secured thereto, a brake lever extending through the wall of the housing and pivotally mounted therein, a second lever mounted on the outside of said housing, a rock shaft, and planetary gearing means connecting said brake lever and said rock shaft.

13. In a motor vehicle, the combination with a support, of a spigot bearing projecting from said support, a housing surrounding said bearing and having a spigot bearing projecting therefrom, and levers mounted on said spigot bearings.

14. In a motor vehicle, the combination with a support, of a spigot bearing projecting therefrom, a housing surrounding said bearing and having a second spigot bearing projecting therefrom, a lever mounted on each of said spigot bearings, a rock shaft mounted inside of the second spigot bearing, and means connecting one of said levers with said rock shaft.

15. In a motor vehicle, the combination with a support, of a spigot bearing projecting therefrom, a housing surrounding said bearing and having a second spigot bearing projecting therefrom, a lever mounted on each of said spigot bearings, a rock shaft mounted inside of the second spigot bearing, and planetary gearing connecting one of said levers with said rock shaft.

16. In a mechanism of the class described, the combination of a spigot bearing an operating lever mounted on said bearing, a rock shaft mounted in axial alignment with said spigot bearing and movement multiplying means between said lever and said rock shaft.

17. In a motor vehicle, the combination of a support, a spigot bearing mounted upon said support, a brake lever mounted upon said bearing, a rock shaft, planetary gearing connecting said lever and said rock shaft, and the rock shaft mounted in axial alignment with the spigot bearing.

18. In a motor vehicle, the combination of a housing, having two compartments, a brake lever mounted in one of said compartments, a switch mounted in the other of said compartments, and means projecting through the wall of said compartment for operating the switch by the brake lever.

19. In a motor vehicle, the combination with a housing having three compartments, a brake lever mounted in one of said compartments, gearing operated by said brake lever mounted in another of said compartments, a switch mounted in the third of said compartments, and means for operating said switch by said brake lever.

20. In a motor vehicle, the combination with the clutch and gear casing, of a brake lever and a clutch lever mounted coaxially thereon, connections from the clutch lever for operating the clutch, means extending through the clutch lever for operating the brakes, and movement multiplying means between the brake lever and said brake operating means.

21. In a motor vehicle, the combination of coaxially mounted brake and clutch levers, a brake operating shaft extending through the clutch lever mounting, and gearing connecting the brake lever and said shaft.

22. In a motor vehicle, the combination of coaxially mounted brake and clutch levers, a brake operating shaft extending through the clutch lever mounting, and movement multiplying means between said brake lever and said shaft.

23. In a motor vehicle, the combination of a housing, a removable cover for the housing, a brake lever supported in the housing and extending through the wall thereof, and a clutch lever mounted on said housing cover.

24. In a motor vehicle, the combination of a housing, a removable cover for the housing, a brake lever supported in the housing and extending through the wall thereof, a clutch lever mounted on said housing cover, a rock shaft extending through said cover, and movement multiplying means connecting said brake lever and said rock shaft.

25. In a motor vehicle, the combination with a support, of a bearing member mounted thereon and having both inside and outside bearing surfaces, a clutch lever mounted on the outside of said bearing member, a brake operating shaft mounted on the inside of said member, an arm on said brake operating shaft, and a lever connected to operate said shaft.

26. In a motor vehicle, the combination with a support, of a bearing member mounted thereon and having both inside and outside bearing surfaces, a clutch lever mounted on the outside of said bearing member, a brake operating shaft mounted on the inside of said member, an arm on the projecting end of said brake operating shaft and adapted to retain the clutch lever on its bearing, and means for operating said brake operating shaft.

27. In a brake operating mechanism, the combination of a brake lever, a brake operating device, and means including planetary gearing and an arm operated thereby connecting said brake lever and said device, the gearing and arm operated thereby arranged so that the initial movement of the brake lever is multiplied in operating the device and the final movement of the brake lever in the application of the brakes has, owing to the advanced position of said arm, its maximum leverage as between the brake lever and said device.

28. In a brake operating mechanism, the combination of a brake lever and a device connected to operate the brakes, and means including planetary gearing and an arm operated thereby connecting said brake lever to said device, said gearing and arm providing a decreased leverage at the beginning of the brake applying movement of the brake lever and owing to the throw of said arm an increased leverage at the final brake applying movement of the brake lever.

In testimony whereof I affix my signature.

ALFRED MOORHOUSE.